United States Patent
Tao et al.

(10) Patent No.: US 9,351,357 B2
(45) Date of Patent: May 24, 2016

(54) LIGHT EMITTING DIODE LAMP AND DRIVER

(71) Applicant: KONINKLIJKE PHILIPS N.V., Eindhoven (NL)

(72) Inventors: Haimin Tao, Eindhoven (NL); Peter Deixler, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/428,652

(22) PCT Filed: Sep. 24, 2013

(86) PCT No.: PCT/IB2013/058803
§ 371 (c)(1),
(2) Date: Mar. 17, 2015

(87) PCT Pub. No.: WO2014/049517
PCT Pub. Date: Apr. 3, 2014

(65) Prior Publication Data
US 2015/0245430 A1    Aug. 27, 2015

Related U.S. Application Data

(60) Provisional application No. 61/705,655, filed on Sep. 26, 2012.

(51) Int. Cl.
*H05B 33/08*     (2006.01)

(52) U.S. Cl.
CPC ........ *H05B 33/0815* (2013.01); *H05B 33/0821* (2013.01); *H05B 33/0887* (2013.01); *Y02B 20/383* (2013.01); *Y02B 20/386* (2013.01)

(58) Field of Classification Search
None
See application file for complete search history.

(56) References Cited

U.S. PATENT DOCUMENTS

| 5,463,280 A | 10/1995 | Johnson |
| 2002/0060526 A1 | 5/2002 | Timmermans et al. |
| 2003/0102810 A1 | 6/2003 | Cross et al. |
| 2004/0062041 A1 | 4/2004 | Cross et al. |
| 2007/0228999 A1 | 10/2007 | Kit |

(Continued)

FOREIGN PATENT DOCUMENTS

| WO | 2012004708 A2 | 1/2012 |
| WO | 2012052875 A2 | 4/2012 |

*Primary Examiner* — Douglas W Owens
*Assistant Examiner* — Dedei K Hammond

(57) ABSTRACT

Light sources (1) for replacing fluorescent lamps (100) are provided with terminals (11, 12) for exchanging alternating current signals having frequencies of at least kHz with drivers (5), with rectifiers (13) having inputs coupled to the terminals (11, 12) via capacitors (14), and with light emitting diodes (15) coupled to outputs of the rectifiers (13). The rectifiers (13) rectify the alternating current signals and the capacitors (14) provide safety to persons installing the light sources (1). Preferably, the light sources (1) have different ends where the different terminals (11, 12) are located. Each terminal (11, 12) may comprise two pins (21, 22, 23, 24) interconnected via fuses (31,32). Drivers (5) for replacing fluorescent ballasts (500) are provided with inputs (51, 52) to be connected to voltage sources (6)and with outputs (53, 55) for exchanging the alternating current signals with the light sources (1). The drivers (5) may comprise switching circuits (61) for producing the alternating current signals, outputs of the switching circuits (61) being coupled to outputs (53, 55) of the drivers (5) via reactive circuits (62, 63, 66) with inductors (62), capacitors (66) and transformers (63).

12 Claims, 4 Drawing Sheets

(56) References Cited

U.S. PATENT DOCUMENTS

| | | |
|---|---|---|
| 2010/0244696 A1 | 9/2010 | Kim |
| 2012/0043892 A1* | 2/2012 | Visser .................... F21V 25/04 315/121 |
| 2012/0161666 A1 | 6/2012 | Antony et al. |
| 2013/0127358 A1* | 5/2013 | Yao .................... H05B 33/0815 315/201 |
| 2013/0342119 A1* | 12/2013 | Malboeuf Joset . H05B 33/0809 315/193 |

* cited by examiner

US 9,351,357 B2

LIGHT EMITTING DIODE LAMP AND DRIVER

CROSS-REFERENCE TO THE PRIOR APPLICATIONS

This application is the U.S. National Phase application under 35 U.S.C. §371 of International Application No. PCT/IB13/058803, filed on Sep. 24, 2013, which claims the benefit of U.S. Provisional Patent Application No. 61/705,655, filed on Sep. 26, 2012. These applications are hereby incorporated by reference herein.

FIELD OF THE INVENTION

The invention relates to a light source comprising at least one light emitting diode and to a driver for driving the light source. The invention further relates to a system comprising the light source and comprising the driver and yet further relates to a method for driving a light source. Examples of such a light source are retrofit light emitting diode tubes.

BACKGROUND OF THE INVENTION

US 2004/0062041 A1 discloses a retrofit light emitting diode tube having a first end for electrical communication and having a second dummy end.

US 2004/0062041 A1 does not disclose any driver. Usually, a driver provides a direct current signal to a light source comprising at least one light emitting diode.

When replacing a fluorescent tube by a light emitting diode tube and at the same time replacing a fluorescent ballast by a driver, to provide safety to a person who is installing the light emitting diode tube, as shown in US 2004/0062041 A1, the light emitting diode tube has been given a first end for electrical communication and a second dummy end. Now this person is no longer in danger when touching one end by hand while the other end is energized via the fixture. This however requires the wiring in the fixture to be adapted, that increases an installation time and increases the costs for replacement.

Further, when a direct current signal is provided to the light emitting diode tube, a polarity problem may occur, that can be solved by adding a polarity indication, that increases an installation time and increases the costs for replacement, or that can be solved by adding circuitry such as a diode rectifier for preventing the polarity problem, that introduces electrical inefficiency and increases the costs for production.

SUMMARY OF THE INVENTION

It is an object of the invention to provide an improved light source and to provide an improved driver. Further objects are to provide an improved system and an improved method.

According to a first aspect, a light source is provided comprising
- first and second terminals for exchanging an alternating current signal with a driver, the alternating current signal having a frequency of at least 1 kHz,
- a rectifier with a first input coupled to the first terminal via a capacitor and with a second input coupled to the second terminal, and
- at least one light emitting diode coupled to outputs of the rectifier.

The light source is designed to replace a fluorescent lamp. The light source and the driver exchange an alternating current signal having a frequency of at least 1 kHz, preferably at least 10 kHz. As a result, a polarity problem will no longer occur between the driver and the light source. Owing to the fact that the at least one light emitting diode needs to be driven with a direct current signal, the rectifier for rectifying the alternating current signal has been added to the light source. Finally, by having added the capacitor between one of the terminals of the light source and one of the inputs of the rectifier, a person who is installing the light source can no longer be badly hurt by the alternating current signal, owing to the fact that the capacitor limits a value of a current signal flowing through the person when being serially coupled to the capacitor.

As a result, an improved light source has been created, that no longer suffers from a polarity problem, and that offers safety to a person who is installing it.

The at least one light emitting diode comprises one or more light emitting diodes of whatever kind and in whatever combination. The rectifier comprises a diode, preferably four diodes in a diode bridge.

An embodiment of the light source is defined by the light source having a first end where the first terminal is located and a second end where the second terminal is located. This light source such as for example a tube has two ends for electrical communication and does not have any dummy end, such that the wiring in a fixture does not need to be adapted.

An embodiment of the light source is defined by the first terminal comprising two first pins at the first end interconnected via a first fuse, the capacitor being connected to one of the first pins, and the second terminal comprising two second pins interconnected via a second fuse, the second input of the rectifier being connected to one of the second pins. The first and second fuses offer protection in case two pins at one end are connected to different terminals of a power supply.

An embodiment of the light source is defined by a current path going from the first terminal via the capacitor and via the rectifier to the second terminal comprising a third fuse. The third fuse offers protection against a current signal flowing from one of the terminals to the other one of the terminals getting a too high value.

An embodiment of the light source is defined by the light source being designed for replacing a fluorescent lamp.

According to a second aspect, a driver is provided comprising
- first and second inputs to be connected to a voltage source, and
- first and second outputs for exchanging an alternating current signal with the light source, the alternating current signal having a frequency of at least 1 kHz.

The driver that drives the light source is designed to replace a fluorescent ballast that drives the fluorescent lamp. The voltage source is for example a mains supply for exchanging an alternating voltage signal having a frequency of 50 Hz or 60 Hz with the driver. The driver exchanges the alternating current signal with the light source having a frequency of at least 1 kHz, preferably at least 10 kHz.

An embodiment of the driver is defined by further comprising
- a switching circuit for producing the alternating current signal, at least one of first and second outputs of the switching circuit being coupled to at least one of the first and second outputs of the driver via a reactive circuit. The switching circuit comprises for example a half bridge or comprises for example a full bridge. The reactive circuit may have an inductive impedance at an operating frequency of the switching circuit such that the switching circuit is operated in a soft switching mode for an improved driver efficiency. The driver may further comprise an electromagnetic interference filter and/or a rectifier and/or a power factor corrector located between the inputs of the driver and inputs of the switching circuit.

An embodiment of the driver is defined by the reactive circuit comprising an inductor coupled to the first output of the switching circuit and to the first output of the driver. The reactive circuit may further comprise a capacitor coupled to the second output of the switching circuit and to the first output of the driver. The reactive circuit including the inductor and the capacitor may form a resonant tank.

An embodiment of the driver is defined by a current path going from the first output of the switching circuit via the inductor to the first output of the driver comprising a capacitor. A person who is installing the driver can no longer be badly hurt by the alternating current signal, owing to the fact that the capacitor limits a value of a current signal flowing through the person when being serially coupled to the capacitor. In case the second outputs of the switching circuit and the driver are not coupled to ground, the capacitor may alternatively be located between these second outputs.

An embodiment of the driver is defined by the reactive circuit further comprising a transformer, a primary side of the transformer being coupled to the inductor and to the second output of the switching circuit and a secondary side of the transformer being coupled to the first and second outputs of the driver. The transformer provides galvanic isolation. One end of the secondary side may be coupled to ground.

An embodiment of the driver is defined by a current path going from the first output of the driver to the second output of the driver comprising a capacitor.

An embodiment of the driver is defined by the driver being designed for replacing a fluorescent ballast.

An embodiment of the driver for further driving a further light source is defined by further comprising
third and fourth outputs for exchanging a further alternating current signal with the further light source, the further alternating current signal having a frequency of at least 1 kHz. One and the same driver may be used for driving more than one light source.

According to a third aspect, a system is provided comprising the light source and comprising the driver.

According to a fourth aspect, a method is provided for driving a light source comprising at least one light emitting diode, the method comprising the steps of
exchanging an alternating current signal between a driver and the light source, the alternating current signal having a frequency of at least 1 kHz,
passing the alternating current signal through a capacitor inside the light source, and
rectifying the alternating current signal inside the light source.

An insight is that direct current signals require polarity attention, where alternating current signals do not. A basic idea is that a light source comprising one or more light emitting diodes should exchange an alternating current signal with a driver, the alternating current signal having a frequency of at least 1 kHz, and that the light source should have an in-built rectifier and an in-built capacitor.

A problem to provide an improved light source and an improved driver has been solved. A further advantage is that safety issues no longer occur and that the wiring in the fixture does not need to be adapted. Finally, the improved driver can further be used for driving a fluorescent lamp (backward compatibility).

These and other aspects of the invention will be apparent from and elucidated with reference to the embodiments described hereinafter.

DETAILED DESCRIPTION OF EMBODIMENTS

Figure 1:
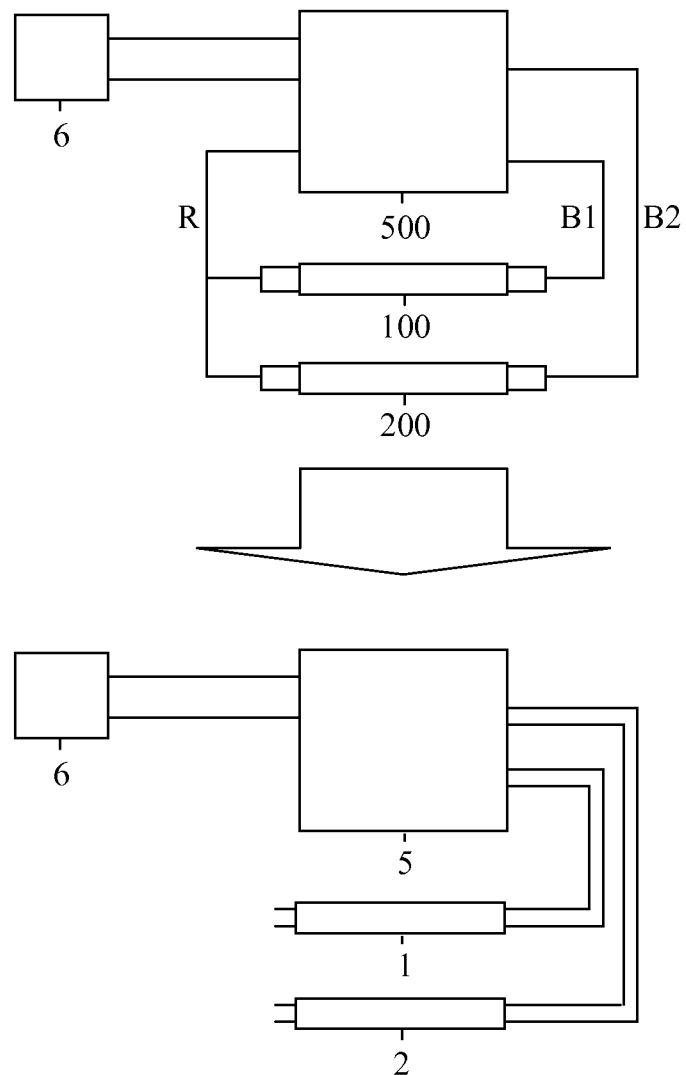
FIG. 1 shows a prior art replacement.

In the FIG. 1, a prior art replacement is shown. Above the arrow, a voltage source 6 is coupled to a fluorescent ballast 500. The fluorescent ballast is coupled via a first BLUE wire B1 to a first terminal of a first fluorescent lamp 100 and via a second BLUE wire B2 to a first terminal of a second fluorescent lamp 200 and via one RED wire R to second terminals of the first and second fluorescent lamps 100 and 200. Below the arrow, a driver 5 for replacing the fluorescent ballast 500 is coupled to the voltage source 6 and is coupled via two wires to first and second pins of a first terminal of a first light source 1 comprising at least one light emitting diode for replacing the first fluorescent lamp 100 and is coupled via two further wires to first and second pins of a first terminal of a second light source 2 comprising at least one light emitting diode for replacing the second fluorescent lamp 200.

The second terminals of the first and second light sources 1 and 2 are dummy terminals. The reason that this has been done is to provide safety to a person who is installing the light source 1, 2. In the past, while locating a lamp into a fixture, this person could touch one end of the lamp by hand while the other end is energized via the fixture, and be badly hurt. By having created dummy terminals, this is no longer possible.

Figure 2:
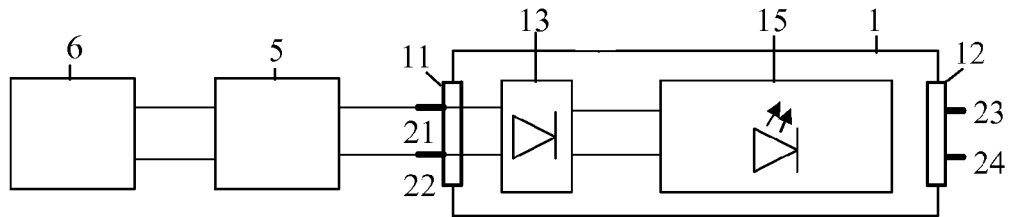
FIG. 2 shows a prior art driver and a prior art light source.

In the FIG. 2, a prior art driver 5 and a prior art light source 1 are shown. Inputs of the driver 5 are coupled to outputs of a voltage source 6, such as a mains supply. Respective outputs of the driver 5 are coupled to respective first and second pins 21 and 22 of a first terminal 11 at a first end of a light source 1. The light source 1 comprises a rectifier 13 with respective first and second inputs coupled to the respective pins 21 and 22 and with outputs coupled to at least one light emitting diode 15. At a second end, the light source 1 has a dummy terminal 12 with first and second pins 23 and 24. Important here is that the prior art driver 5 provides a direct current signal to the light source 1. The rectifier 13 inside the light source 1 is only present to overcome a polarity problem and thereby introduces electrical inefficiency and increases the costs.

Figure 3:
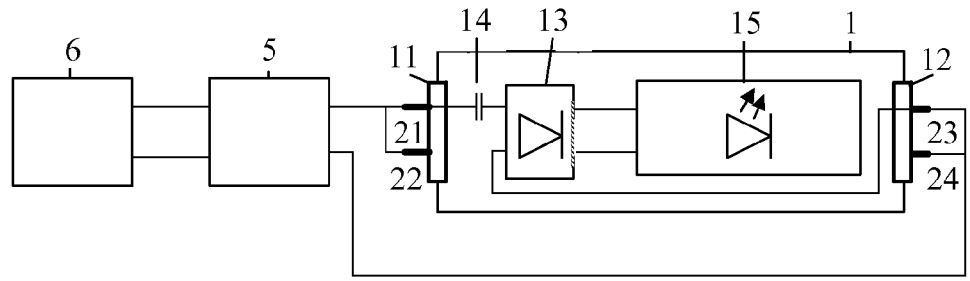
FIG. 3 shows an improved driver and an improved light source.

In the FIG. 3, an improved driver 5 and an improved light source 1 are shown. Inputs of the driver 5 are coupled to outputs of a voltage source 6, such as a mains supply. A first output of the driver 5 is coupled to both first and second pins 21 and 22 of a first terminal 11 at a first end of a light source 1. A second output of the driver 5 is coupled to both first and second pins 23 and 24 of a second terminal 12 at a second end of the light source 1. The light source 1 comprises a rectifier 13 with a first input coupled via a capacitor 14 to both first and second pins 21 and 22 and with a second input coupled to both pins 23 and 24. Outputs of the rectifier 13 are coupled to at least one light emitting diode 15. Important here is that the improved driver 5 exchanges an alternating current signal with the light source 1, the alternating current signal having a frequency of at least 1 kHz. The rectifier 13 inside the light source 1 is present to rectify this alternating current signal. The capacitor 14 provides safety to a person who is installing the light source 1, owing to the fact that the capacitor 14 limits a value such as for example an amplitude of a current signal flowing through the person when being serially coupled to the capacitor 14. Further, the capacitor 14 determines the value of the current signal flowing through the at least one light emitting diode 15. The capacitor 14 may be given a value such that at for example 1 kHz or 10 kHz its relatively low impedance will allow sufficient current to flow and such that at 50 Hz or 60 Hz its relatively high impedance will prevent a person from being badly hurt.

Figure 4:
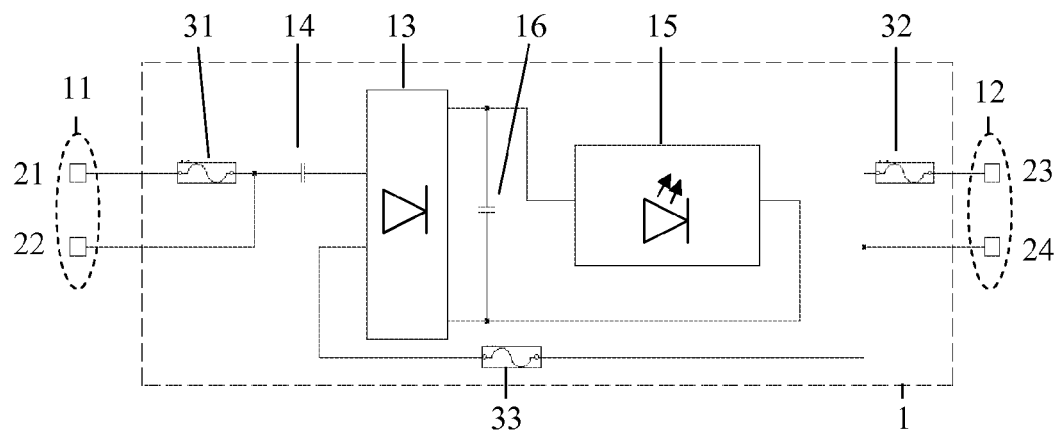
FIG. 4 shows an embodiment of a light source in greater detail.

In the FIG. 4, an embodiment of a light source 1 is shown in greater detail. Of the first terminal 11, the first pin 21 is coupled to one side of a first fuse 31 and the second pin is coupled to the other side of the first fuse 31 and to one side of the capacitor 14. The other side of the capacitor 14 is coupled to the first input of the rectifier 13, and the second input of the rectifier 13 is coupled to one side of a third fuse 33. The other side of the third fuse 33 is coupled to the second pin 24 of the second terminal 12 and to one side of a second fuse 32. The other side of the second fuse 32 is coupled to the first pin 23 of the second terminal 12. Outputs of the rectifier 13 are coupled to a parallel connection of a capacitor 16 and the at least one light emitting diode 15.

The rectifier 13 comprises a diode, preferably four diodes in a diode bridge. The fuses can be real fuses or can be other components having a fuse function. The capacitor 16 has a filtering function. The first and second fuses 31, 32 offer protection in case two pins at one end are connected to different terminals of a power supply. The third fuse 33 offers protection against a current signal flowing from one of the terminals to the other one of the terminals getting a too high value.

Figure 5:
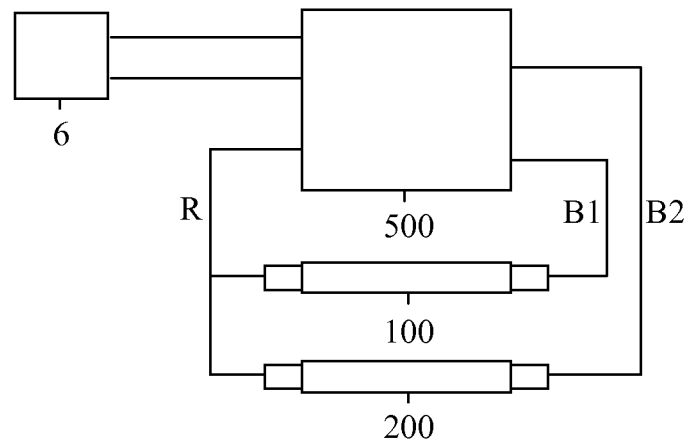
FIG. 5 shows an improved replacement.
Figure 5:
Figure 5:
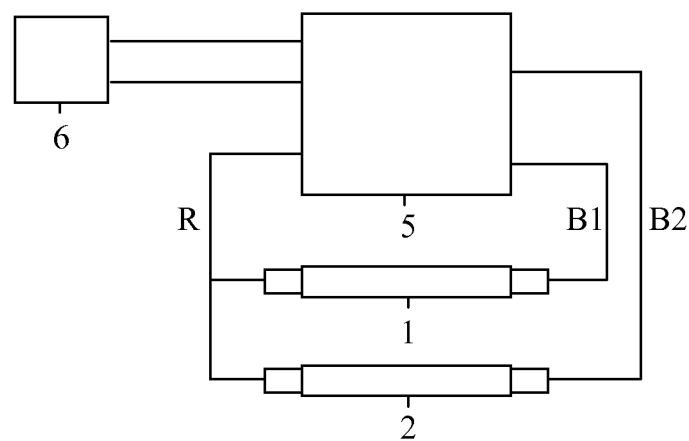

In the FIG. 5, an improved replacement is shown, when using the driver 5 and the light source 1 as shown in the FIG. 3. Above the arrow, as described for the FIG. 1, a voltage source 6 is coupled to a fluorescent ballast 500. The fluorescent ballast is coupled via a first BLUE wire B1 to a first terminal of a first fluorescent lamp 100 and via a second BLUE wire B2 to a first terminal of a second fluorescent lamp 200 and via one RED wire R to second terminals of the first and second fluorescent lamps 100 and 200. Below the arrow, a driver 5 for replacing the fluorescent ballast 500 is coupled to the voltage source 6 and is coupled via a first BLUE wire B1 to the first and second pins of the first terminal of a first light source 1 comprising at least one light emitting diode for replacing the first fluorescent lamp 100 and via a second BLUE wire B2 to the first and second pins of a first terminal of a second light source 2 comprising at least one light emitting diode for replacing the second fluorescent lamp 200 and via one RED wire R to the first and second pins of the second terminals of the first and second light sources 1, 2. Clearly, any re-wiring belongs to the past.

Figure 6:
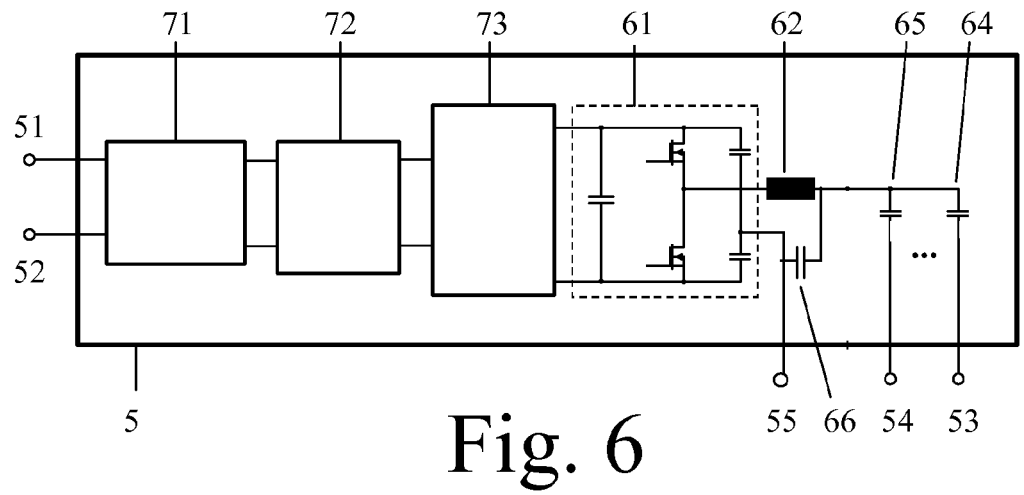
FIG. 6 shows a first embodiment of an improved driver.

In the FIG. 6, a first embodiment of an improved driver 5 is shown. The driver 5 comprises first and second inputs 51, 52 to be connected to the voltage source 6, and comprises first and second outputs 53, 55 for exchanging the alternating current signal with the light source 1, the alternating current signal having a frequency of at least 1 kHz.

The driver 5 may further comprises a switching circuit 61 for producing the alternating current signal, whereby the first and second outputs of the switching circuit 61 are coupled to the first and second outputs 53, 55 of the driver 5 via a reactive circuit 62, 66. Here, the reactive circuit 62, 66 comprises an inductor 62 coupled to the first output of the switching circuit 61 and to the first output 53 of the driver 5 and comprises a capacitor 66 coupled to the second output of the switching circuit 61 and to the first output 53 of the driver 5. Alternatively, the capacitor 66 may be left out. The switching circuit 61 comprises for example a half bridge or comprises for example a full bridge. The driver 5 may further comprise a capacitor 64 coupled serially to the inductor 62 or alternatively coupled serially between the second output of the switching circuit 61 and the second output 55 of the driver 5. The inductor 62 and the capacitor 66 may form a resonant tank. The reactive circuit 62, 66 may have an inductive impedance at an operating frequency of the switching circuit such that the switching circuit is operated in a soft switching mode for an improved driver efficiency.

In case the driver 5 as shown in the FIG. 6 and the light source 1 as shown in the FIG. 4 are connected, a serial circuit of the capacitors 64 and 14 will define an amplitude of the alternating current signal exchanged between said driver 5 and said light source 1. Just like the capacitor 14, the capacitor 64 provides safety to a person who is installing the system or parts thereof.

To be able to further drive one or more further light sources, the driver 5 may be provided with a third output 54 and with a fourth output 55. Here the second and fourth outputs are the same output 55, alternatively they may be different outputs. And, here, the third output 54 is coupled via a capacitor 65 to the inductor 62. The light sources are driven independently, meaning that in case one of them is removed, the other one keeps on working. This is another great advantage of the improved driver 5.

The driver 5 may further comprise an electromagnetic interference filter 71 with inputs coupled to the inputs 51, 52 and with outputs coupled to inputs of the switching circuit 61. The driver 5 may further comprise a rectifier 72 with inputs coupled to the inputs 51, 52 and with outputs coupled to inputs of the switching circuit 61. The driver 5 may further comprise a power factor corrector 73 with inputs coupled to the inputs 51, 52 and with outputs coupled to inputs of the switching circuit 61. A combination of two or more of these units 71-73 is possible too. The electromagnetic interference filter 71 is required in case electromagnetic interference needs to be filtered. The rectifier 72 is required in case the voltage source 6 does not provide a direct current signal. And the power factor corrector 73 is required in case the power factor needs to be corrected.

Figure 7:
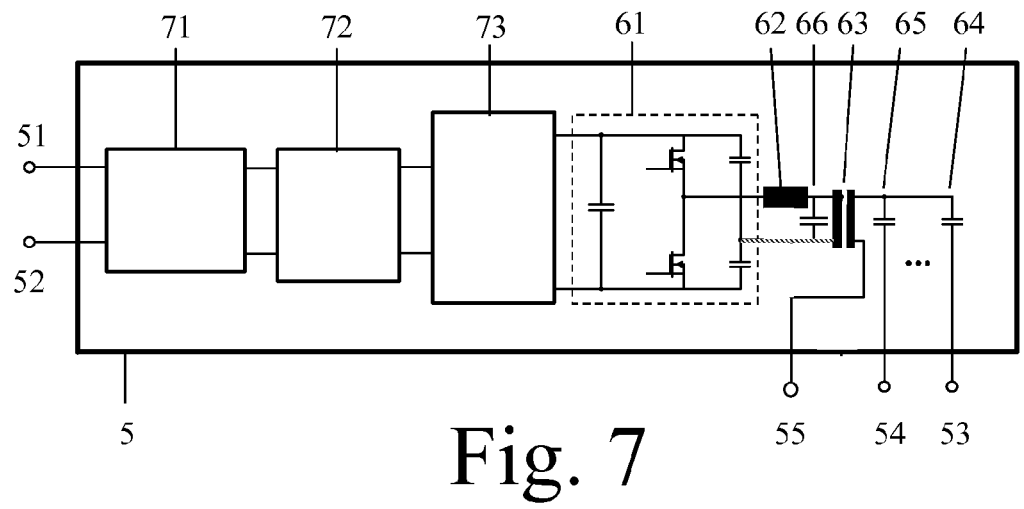
FIG. 7 shows a second embodiment of an improved driver.

In the FIG. 7, a second embodiment of an improved driver 5 is shown. This second embodiment differs from the first embodiment shown in the FIG. 6 in that the reactive circuit 62, 63, 66 further comprises a transformer 63. A primary side of the transformer 63 is coupled in parallel to the capacitor 66 discussed before and a secondary side of the transformer 63 is coupled to the first and second outputs 53, 55 of the driver 5 via the capacitor 64. The transformer 63 provides galvanic isolation. One end of the secondary side may be coupled to ground.

To be able to further drive one or more further light sources, the driver 5 may be provided with a third output 54 and with a fourth output 55. Again, here the second and fourth outputs are the same output 55, alternatively they may be different outputs. And, here, the third output 54 is coupled via a capacitor 65 to the secondary side of the transformer 63. Alternatively, the transformer 63 may have several secondary sides, for example one per light source.

Summarizing, light sources 1 for replacing fluorescent lamps 100 are provided with terminals 11, 12 for exchanging alternating current signals having frequencies of at least 1 kHz with drivers 5, with rectifiers 13 having inputs coupled to the terminals 11,12 via capacitors 14, and with light emitting diodes 15 coupled to outputs of the rectifiers 13. The rectifiers 13 rectify the alternating current signals and the capacitors 14 provide safety to persons installing the light sources 1. Preferably, the light sources 1 have different ends where the different terminals 11,12 are located. Each terminal 11,12 may comprise two pins 21, 22, 23, 24 interconnected via fuses 31, 32. Drivers 5 for replacing fluorescent ballasts 500 are provided with inputs 51, 52 to be connected to voltage sources 6 and with outputs 53, 55 for exchanging the alternating current signals with the light sources 1. The drivers 5 may comprise switching circuits 61 for producing the alternating current signals, outputs of the switching circuits 61 being coupled to outputs 53, 55 of the drivers 5 via reactive circuits 62, 63, 66 with inductors 62, capacitors 66 and transformers 63.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light source comprising:
    first and second terminals configured for exchanging with a driver an alternating current signal of at least 1 kHz, the light source having a first end where the first terminal is located and a second end where the second terminal is located, the first terminal comprising two first pins and the second terminal comprising two second pins,
    a rectifier with a first input coupled to the first terminal and with a second input coupled to the second terminal, and
    at least one light emitting diode coupled to outputs of the rectifier, wherein the first input of the rectifier is coupled to the first terminal via a capacitor,
    wherein the two first pins are interconnected via a first fuse, the capacitor being connected to one of the first pins, and the two second pins are interconnected via a second fuse.

2. The light source as defined in claim 1, a current path going from the first terminal via the capacitor and via the rectifier to the second terminal comprising a third fuse.

3. The light source as defined in claim 1, the light source being designed for replacing a fluorescent lamp.

4. A system comprising a light source as defined in claim 1 and a driver, wherein the driver further comprises:
    first and second inputs to be connected to a voltage source, and
    first and second outputs for exchanging with the light source an alternating current signal generated by the driver, the alternating current signal having a frequency of at least 1 kHz.

5. The system as defined in claim 4, the driver further comprises:
    a switching circuit for producing the alternating current signal, at least one of first and second outputs of the switching circuit being coupled to at least one of the first and second outputs of the driver via a reactive circuit.

6. The system as defined in claim 5, the reactive circuit comprising an inductor coupled to the first output of the switching circuit and to the first output of the driver.

7. The system as defined in claim 6, a current path going from the first output of the switching circuit is the inductor to the first output of the driver comprising a capacitor.

8. The system as defined in claim 6, the reactive circuit further comprising a transformer, a primary side of the transformer being coupled to the inductor and to the second output of the switching circuit and a secondary side of the transformer being coupled to the first and second outputs of the driver.

9. The system as defined in claim 8, a current path going from the first output of the driver to the second output of the driver comprising a capacitor.

10. The system as defined in claim 4, the driver being designed for replacing a fluorescent ballast.

11. A system for driving a light source, the light source comprising:
    first and second terminals configured for exchanging with a driver an alternating current signal of at least 1 kHz, the light source having a first end where the first terminal is located and a second end where the second terminal is located, the first terminal comprising two first pins and the second terminal comprising two second pins,
    a rectifier with a first input coupled to the first terminal and with a second input coupled to the second terminal, and
    at least one light emitting diode coupled to outputs of the rectifier, wherein the first input of the rectifier is coupled to the first terminal via a capacitor;
    the driver further comprising:
    first and second inputs to be connected to a voltage source,
    first and second outputs for exchanging with the light source an alternating current signal generated by the driver, the alternating current signal having a frequency of at least 1 kHz, and
    third and fourth outputs for exchanging a further alternating current signal with the further light source, the further alternating current signal having a frequency of at least 1 kHz.

12. A method for driving a light source comprising at least one light emitting diode, the method comprising the steps of:
    providing a light source having a first end where a first terminal is located and a second end where a second terminal is located, the first terminal comprising two first pins and the second terminal comprising two second pins, wherein the two first pins are interconnected via a first fuse, a capacitor inside the light source being connected to one of the first pins, and the two second pins are interconnected via a second fuse,
    exchanging an alternating current signal between a driver and the light source, the alternating current signal having a frequency of at least 1 kHz,
    passing the alternating current signal through the capacitor inside the light source, and
    rectifying the alternating current signal inside the light source.

* * * * *